United States Patent [19]

Fraser

[11] Patent Number: 5,006,380
[45] Date of Patent: Apr. 9, 1991

[54] DRAW TAPE BAG WITH MULTILAYER DRAW TAPE

[75] Inventor: Robert W. Fraser, Evergreen Park, Ill.

[73] Assignee: First Brands Corporation, Danbury, Conn.

[21] Appl. No.: 395,139

[22] Filed: Aug. 16, 1989

Related U.S. Application Data

[63] Continuation-in-part of Ser. No. 212,453, Jun. 28, 1988, abandoned.

[51] Int. Cl.$^5$ .................................... B65D 33/28
[52] U.S. Cl. ............................. 428/35.2; 383/72; 383/75; 428/101
[58] Field of Search ............ 156/70; 383/72, 75, 383/76; 428/35.2, 35.5, 101, 34.1

[56] References Cited

U.S. PATENT DOCUMENTS

| | | | |
|---|---|---|---|
| 2,798,523 | 7/1957 | Barrett | 383/75 X |
| 2,815,063 | 12/1957 | LaFleur | 156/537 |
| 2,897,729 | 8/1959 | Ashton et al. | 156/70 X |
| 3,029,853 | 4/1962 | Piazze | 383/75 |
| 3,506,048 | 4/1970 | Jortikka | 383/6 |
| 3,687,357 | 8/1972 | Hansen | 383/72 |
| 4,126,262 | 11/1978 | Thompson et al. | 428/215 X |
| 4,348,348 | 9/1982 | Bennett et al. | 264/255 |
| 4,390,573 | 6/1983 | Bullard et al. | 428/212 X |
| 4,511,609 | 4/1985 | Craver et al. | 428/35.2 |
| 4,624,654 | 11/1986 | Boyd et al. | 493/194 |
| 4,626,654 | 12/1986 | Esser et al. | 219/121.52 |
| 4,664,649 | 5/1987 | Johnson et al. | 156/499 X |
| 4,722,970 | 2/1988 | Nakagoshi et al. | 525/164 |
| 4,777,066 | 10/1988 | White et al. | 156/70 X |

*Primary Examiner*—Henry F. Epstein
*Attorney, Agent, or Firm*—Gary L. Wamer

[57] ABSTRACT

A draw tape bag comprising: (a) two panels formed from a thermoplastic material, the sides of said panels being joined on three sides and open on the fourth side to form a top in said bag; (b) a hem portion of each panel being folded over adjacent said top to form a tubular hem; (c) draw tapes in each tubular hem secured at said sides of said panels, said draw tapes being characterized as a multilayer structure having at least two layers wherein one layer is sealable to a panel and is characterized as having sealability to the thermal plastic panels greater than at least one of other layers of the draw tape and also characterized as having strength less than said other layer of the draw tape; (d) a seal between each hem portion and the adjacent panel across the width of said bag below said draw tape; and (e) an opening in said hem portion for accessing said draw tape.

39 Claims, 1 Drawing Sheet

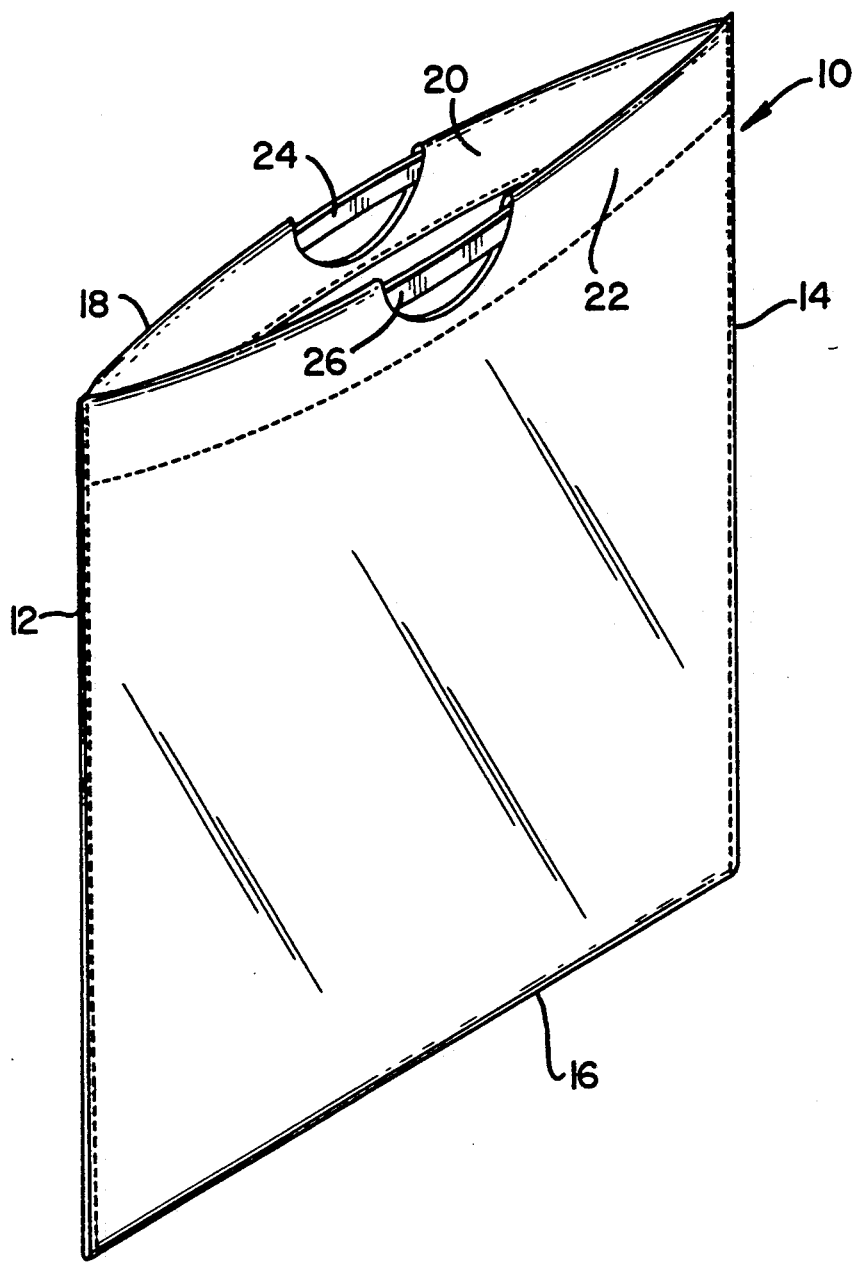

DRAW TAPE BAG WITH MULTILAYER DRAW TAPE

FIELD OF THE INVENTION

The instant invention relates to draw tape bags wherein a multilayer draw tape is provided to improve the performance and ease of use of the draw tape bag.

BACKGROUND OF THE INVENTION

Draw tape bags have been commercially available for several years. For example, draw tape or draw cord bags are generally described in U.S. Pat. Nos. 2,798,523, 3,029,853, 3,506,048 and 3,687,357. Draw tape bags are formed by employing two pliable plastic sheets joined on three sides (or a U-folded plastic sheet joined on two sides) and open on the remaining side. A tubular hem is provided at the open edge of each sheet and contains a cord(s) or pliable thermoplastic strip(s). One or more access holes are provided in the tubular hem to expose the cord(s) or strip(s), so as to facilitate pulling the cord(s) or strip(s) through the opening(s). The action of pulling the cord(s) or strip(s) through the opening results in both closing the open mouth of the bag and formation of a handle whereby the bag may be carried by means of the cord(s) or strip(s).

The manufacture of multilayer films has been disclosed in the patent literature for several years, but there has not been a disclosure or teaching as to the use of a multilayer material as a draw tape in a draw tape bag. A multilayer trash bag film is disclosed in U.S. Pat. No. 4,511,609 wherein the film comprises a first outer layer of low pressure, low density polyethylene, a core layer of high pressure, low density polyethylene, and a second outer layer of high pressure, low density polyethylene. U.S. Pat. No. 4,126,262 discloses an all-plastic heat sealable container material comprising a core layer of high density thermoplastic polymeric material having a specific gravity of about 0.950 to about 0.965, having a thickness of 15 mils to 17.5 mils and outer layers of a lower density thermoplastic polymeric material having a specific gravity of about 0.918 to about 0.930, a thickness of about 0.75 mils to about 2.0 mils and characterized as having a lower softening point. The multiple layer composite blank may be formed using a core layer of high density polyethylene and the outer layers may be formed of low density polyethylene, as shown in the examples beginning at column 10, line 39. The low softening point of the outside layers permits heat sealing while the core layer is not significantly thermally affected. The thickness of the core layer (15 mils to 17.5 mils) provides structural support to the container. U.S. Pat. No. 4,390,573 discloses laminar thermoplastic films having a first layer of low density polyethylene bonded to a layer of a dissimilar polymer blend comprising high density polyethylene and polyethylene copolymers. As is clear from the above discussion, the above discussed patents do not relate to draw tape bags and the unique problems associated with the strength of the draw tape and its sealability to relatively thin pliable bag forming materials.

SUMMARY OF THE INVENTION

The instant invention relates to a draw tape bag comprising: (a) two panels formed from a thermoplastic material, the sides of said panels being joined on three sides and open on the fourth side to form a top in said bag; (b) a hem portion of each panel being folded over adjacent said top to form a tubular hem; (c) draw tapes in each tubular hem secured at said sides of said panels by heat sealing, said draw tapes being characterized as a multilayer draw tape having at least two layers wherein a first layer is characterized as having heat sealability to said thermal plastic panel and itself greater than to the second layer of the draw tape, and said first layer also being characterized as having strength less than said second layer of the draw tape; (d) a seal between each hem portion and the adjacent panel across the width of said bag below said draw tape; and (e) an opening in said hem portion for accessing said draw tape.

BRIEF DESCRIPTION OF THE DRAWING

FIG. 1 is a diagrammatic perspective view of an individual bag body formed by transversely severing a portion of a continuous length of material and having sealed severed edges.

DESCRIPTION OF THE INVENTION

The instant invention relates to a draw tape bag wherein the draw tape is characterized as having a multilayer structure comprising at least two different thermoplastic materials. In one embodiment the draw tape is a two layer draw tape comprising a first layer characterized as having heat sealability to the thermoplastic bag material and itself greater than the heat sealability of a second layer to the thermoplastic bag material or itself and said second layer also characterized as having greater strength than said first layer, as hereinafter discussed.

The use of a multilayer draw tape has several advantages over the use of a draw tape formed of a single material. Further, use of a multilayer draw tape of two or more materials has been found to be advantageous when compared to a single layer draw tape formed from a multi-component blend of the same materials. A multilayer draw tape permits the use of a strong tape material to provide strength to the draw tape without sacrificing the seal strength of the heat seals to the bag panels. In addition, the tactile qualities of strong thermoplastic materials tend to be unsatisfactory, since such stronger thermoplastic materials tend to have harder surfaces that cut into the hand of the user when the draw tape is used as a handle. Since the design of a draw tape bag is such that the draw tape is used as a handle by which the bag and its contents are carried after the bag is filled, the harder the surface of the material forming the draw tape the more uncomfortable is its use when the weight of the contents of the draw tape bag applies force upon the draw tape and causes it to cut into the user's hand. Further, the ability of many strong thermoplastic materials, e.g., high density polyethylene, to form heat seals tends to be somewhat less than the heat seals formed with other (weaker) thermoplastic materials, as judged by the strength of the heat seals formed with less strong thermoplastic materials.

To overcome the problems associated with the strength of the draw tape and the heat seal strength, when the draw tapes and panel of the bag are sealed at the side of the bag, a physical blend of two thermoplastic materials has been commercially employed to form the draw tape. Such a draw tape exhibits a blend of the properties of each thermoplastic material. In this instance the draw tape is a single layer of two blended thermoplastic materials, e.g., 50 weight percent low density polyethylene and 50 weight percent high density polyethylene. The resulting draw tape exhibits some properties derived from both materials but does not exhibit the best properties of both as to either the ability to form heat seals or the strength of the stronger thermoplastic material.

The instant invention overcomes the problems associated with single layer draw tapes by forming the draw tape from at least two layers of two different thermoplastic materials. The first layer of the draw tape comprises a material characterized by its ability to form strong heat seals with the thermoplastic film employed to form the panels of the draw tape bag and with itself. For example, the panels of a draw tape bag are commonly formed from a low density polyethylene having a thickness between about 0.5 mil and about 2.0, preferably between 0.5 mil and about 1.5 mils. The first layer of the draw tape may comprise the same low density polyethylene employed in the manufacture of the panels of the bag. The second layer of the draw tape is characterized as a thermoplastic material which is stronger than said first material but which does not form a heat seal with the material(s) forming the panels of the bag or with itself which is as strong as the heat seal formed by the first layer. For example, when the first layer is low density polyethylene the second layer may be a high density polyethylene. In one embodiment the first layer is a low density polyethylene having a density between about 0.900 grams per cubic centimeter and up to 0.935 grams per cubic centimeter, preferably between about 0.900 grams per cubic centimeter and about 0.930 grams per cubic centimeter, and the second layer is a high density polyethylene having a density from greater than 0.935 grams per cubic centimeter up to about 0.965 grams per cubic centimeter, preferably between 0.945 grams per cubic centimeter and 0.965 grams per cubic centimeter. This draw tape is advantageous when used as the draw tape of a draw tape bag formed with panels formed of a low density polyethylene.

In its broadest sense the invention relates to a draw tape bag formed of thermoplastic materials wherein the draw tape is formed of at least two layers wherein each layer is formed of a different thermoplastic material, and, further, each layer is characterized as having different strength and different heat sealability to the thermoplastic material forming the side panels of the bag and, further, to itself.

In one embodiment the invention comprises a draw tape bag comprising: (a) two panels formed from a thermoplastic material, the sides of said panels being joined on three sides and open on the fourth side to form a top in said bag; (b) a hem portion of each panel being folded over adjacent said top to form a tubular hem; (c) draw tapes in each tubular hem secured at said sides of said panels by heat sealing, said draw tapes being characterized as having a multilayer structure having at least two layers wherein a first layer is characterized as having heat sealability to said thermoplastic panel and itself greater than to the second layer of the draw tape, said first layer also being characterized as having strength less than said second layer of the draw tape; (d) a seal between each hem portion and the adjacent panel across the width of said bag below said draw tape; and (e) an opening in said hem portion for accessing said draw tape.

In another embodiment the multilayer draw tape comprises a three layer draw tape having a first outer layer, a core layer and a second outer layer. The first and second outer layers are characterized as forming stronger heat seals to the thermoplastic bag material forming the panels of the draw tape bag and to itself than the core material forms with bag material and itself and, is further characterized as having less strength than the core material. In this embodiment the first and second outer layers (which may be the same or different, the less strong and more heat sealable materials) may be selected from the group consisting of low density polyethylene, ethylene-methyl acrylate, ethylene-ethyl acrylate, ethylene-vinyl acetate, ultra low density polyethylene (e.g., having a density less than 0.915 g/cm$^3$) and mixtures thereof and the core layer (or the stronger and less heat sealable thermoplastic material) is selected from the group consisting of high density polyethylene, polyesters, polyamides (including polyamides such as nylon-6/6, nylon-6/9, nylon-6/10 and nylon-6/12 and polycaproamide), oriented polyethylenes, and mixtures thereof, and the like. Oriented polyethylenes are well known in the art. For example, polyethylene materials may be oriented in a direction by physical stretching or by use of ring compounds, such as disclosed in U.S. Pat. No. 4,722,970. In a further embodiment the first and second outer layers comprise a low density polyethylene having a density between about 0.900 grams per cubic centimeter and up to but less than 0.935 grams per cubic centimeter, preferably between about 0.900 grams per cubic centimeter and about 0.930 grams per cubic centimeter, and the core layer comprises a high density polyethylene having a density between about 0.935 grams per cubic centimeter and about 0.965 grams per cubic centimeter, preferably between about 0.945 and about 0.965 grams per cubic centimeters. Low density polyethylenes suitable in this embodiment are characterized by the aforementioned densities and may be further characterized by melt indexes between about 0.2 and about 2.0 decigrams per minute, preferably between about 0.5 and about 2.0 decigrams per minute. High density polyethylenes suitable in this embodiment are characterized by the aforementioned densities and may be further characterized by melt indexes between about 0.05 and about 6.0 decigrams per minute, preferably between about 0.05 and about 2.0 decigrams per minute.

The thermoplastic materials employed herein may contain routinely employed materials including fillers, colorants (pigments and/or dyes), slip agents, curing agents and the like.

The relative amount of each layer in the multilayer draw tape may be characterized by either the relative weight ratios of the respective layers or by reference to their thickness. The draw tape employed in a draw tape bag is generally between about 1 mil and about 4 mils thick, preferably between about 2 mils and about 3 mils and is about 1 inch wide and may be as wide as the tubular hem of the draw tape bag. In an embodiment having two layers, the weight ratio of the more heat sealable layer to the stronger layer is between about 1:20 and about 10:1, preferably between about 1:8 and about 2:1. When the draw tape comprises three layers the weight ratio of the first outer layer to the core layer and of the second outer layer to the core layer are both between about 1:20 and about 10:1, preferably between about 1:8 and about 2:1. The weight ratio of the first outer layer to the second outer layer is generally between about 1:20 and about 20:1, preferably between about 1:8 and about 2:1. The relative thickness ratio of the respective layers of the multilayer draw tape is approximately the same ratio as the weight ratios if each layer has substantially the same width with differences arising from the density differences of the different thermoplastic materials.

It has been found that use of a three layer draw tape in forming a draw tape bag having a first outside layer and a second outside layer comprising low density polyethylene and a core layer of high density polyethylene having a weight ratio of 1:2:1 provides an improved draw tape for a draw tape bag as compared to a blend (in equal amounts) of low density polyethylene and high density polyethylene formed in a single layer, as hereinafter discussed.

The use of the multilayer draw tape provides two significant advantages over a single layer draw tape formed as a blend of substantially the same thermoplastic materials in the same weight ratios. The strength of the heat seal of the draw tape at the side of the thermoplastic pliable walls of the bag draw tape is improved without loss of strength of the draw tape, since the bag wall (panel) is heat sealed to a thermoplastic material selected for its superior heat sealing properties and not for its overall load bearing strength. The term "strength" as used herein in reference to a thermoplastic material means the tensile strength (load bearing strength). The term "greater sealability" means the formation of a heat seal of the thermoplastic material with a second thermoplastic material such that it requires a greater force to produce failure, e.g., separation, of that heat seal as compared to a heat seal formed with the second material and a third material. The first material is said to have "sealability" to the second material greater than that of the second material and the third material. The "strength" of a draw tape or a heat seal may be evaluated by ASTM Test Method D638-84 (Test Method A), (approved Jul. 27, 1984), entitled "TENSILE PROPERTIES OF PLASTICS". ASTM Test Method D882-83 (approved Jul. 29, 1983), entitled "TENSILE PROPERTIES OF THIN PLASTIC SHEETING" is also useful as a method for evaluating the strength of materials and/or heat sealed materials. ASTM Test Methods D638-84 and D882-83 are incorporated herein by reference thereto.

The term "draw tape bag" is understood to refer to a bag 10, as depicted in FIG. 1, having sides 12 and 14, bottom 16, top 18, tubular hems 20 and 22 containing draw tapes 24 and 26. Bottom 16 may be joined by a heat seal or as a fold in a U-folded or J-folded sheet material. (The heat seals forming the tubular hem are shown in phantom). The manufacture of draw tape bags is well known in the art as demonstrated by the manufacturing method and the draw tape bags disclosed in U.S. Pat. Nos. 4,624,654, 4,664,649, 2,815,063 and 2,897,729, incorporation in their entirety herein by reference thereto.

The following examples are provided to further illustrate the invention and are not intended to be limiting thereof:

EXAMPLE 1

Multilayer draw tapes were prepared by blown film coextrusion of three film layers through a tubular die. The low density polyethylene layers were supplied by a 3.5 inch single screw extruder at a screw speed of about 12.5 r.p.m. at a head pressure of about 1800 p.s.i. The high density polyethylene layer was supplied by a 3.5 inch single screw extruder at a screw speed of about 12.5 r.p.m. at a head pressure of about 3025 p.s.i. An apparatus useful in forming multilayer blown films is more fully disclosed in U.S. Pat. No. 4,348,348, incorporated herein by reference thereto. Another method for forming a multilayer film is disclosed in U.S. Pat. No. 4,126,262, incorporated herein by reference. The discharge from the die was blown into a multilayer film having a thickness, as shown in Tables I and II. The weight ratio of the first layer to the second layer to the third layer was about 1:2:1, where by about 50 weight percent of the draw tape was the core layer comprising high density polyethylene with the outer two layers comprising low density polyethylene, each being about 25 weight percent by weight of the total weight of the draw tape.

A single layer draw tape was formed by supplying a blend of 50 percent by weight of the same low density polyethylene and 50 percent by weight of the same high density polyethylene employed above via a 4.5 inch single screw extruder at a screw speed of about 50 r.p.m. at a head pressure of about 6500 p.s.i. The low density polyethylene and high density polyethylene were the same materials employed in manufacturing the multilayer film.

The blown films for both the multilayer and single layer draw tapes were cut into strips about 1.0 inches wide for use in forming draw tape bags. Twenty draw tapes using each type of draw tape were used to form draw tape bags by placing the draw tape in the tubular hem formed by folding the hem portion over adjacent the top edge of the bag film followed by heat sealing under the same heat sealing conditions. The heat sealing was done using a Weldotron Model 6313 (sold by Weldotron Corporation, Newark, N.J.) using heat setting number 4 and a dwell time (sealing time) of 1 second. The pliable bag film employed to form the draw tape bag seal was a 1.0 mil thick low density polyethylene having hexene-1 as a comonomer.

The sealability of each draw tape to the low density polyethylene bag film and itself as exhibited by the heat seals was evaluated by ASTM Test Method D882-83, Test Method (A) to determine the tensile load and tensile elongation at the yield point for the heat sealed draw tape and 1.0 mil bag film. The tensile load and tensile elongation at the break point of the bag film were also measured. The coefficient of seal load (COSL) and coefficient of seal elongation COSE were then calculated as follows:

$$COSL = \frac{\text{Tensile Load of Seal}}{\text{Tensile Load of Film}}$$

$$COSE = \frac{\text{Tensile Elongation of Seal}}{\text{Tensile Elongation of Film}}$$

The results of these tests are set forth below in Table I (single layer draw tape) and Table II (multilayer draw tape).

TABLE I (SINGLE LAYER DRAW TAPE)

| Sample No. | Thickness (mils) | Load (lbs.) | Elongation (%) | COSL | COSE |
|---|---|---|---|---|---|
| 1 | 3.40 | 10.11 | 110.00 | 0.55 | 0.18 |
| 2 | 3.45 | 10.68 | 130.00 | 0.58 | 0.21 |
| 3 | 3.30 | 10.09 | 129.00 | 0.55 | 0.21 |
| 4 | 3.45 | 10.03 | 105.00 | 0.55 | 0.17 |
| 5 | 3.50 | 10.62 | 218.00 | 0.58 | 0.36 |
| 6 | 3.35 | 10.20 | 147.00 | 0.56 | 0.24 |
| 7 | 3.40 | 9.95 | 100.00 | 0.54 | 0.16 |
| 8 | 3.45 | 10.32 | 192.00 | 0.56 | 0.32 |
| 9 | 3.45 | 10.79 | 238.00 | 0.59 | 0.39 |
| 10 | 3.40 | 9.30 | 87.00 | 0.51 | 0.14 |
| 11 | 3.50 | 10.05 | 131.00 | 0.55 | 0.22 |

TABLE I-continued (SINGLE LAYER DRAW TAPE)

| Sample No. | Thickness (mils) | Load (lbs.) | Elongation (%) | COSL | COSE |
|---|---|---|---|---|---|
| 12 | 3.40 | 10.16 | 101.00 | 0.56 | 0.17 |
| 13 | 3.40 | 10.04 | 132.00 | 0.55 | 0.22 |
| 14 | 3.45 | 9.90 | 123.00 | 0.54 | 0.20 |
| 15 | 3.40 | 9.70 | 105.00 | 0.53 | 0.17 |
| 16 | 3.40 | 10.03 | 97.00 | 0.55 | 0.16 |
| 17 | 3.45 | 10.17 | 180.00 | 0.56 | 0.30 |
| 18 | 3.35 | 10.64 | 217.00 | 0.58 | 0.36 |
| 19 | 3.45 | 9.66 | 117.00 | 0.53 | 0.19 |
| 20 | 3.40 | 10.46 | 253.00 | 0.57 | 0.42 |
| Average | 3.42 | 10.15 | 145.60 | 0.55 | 0.24 |
| Std. Dev. | 0.05 | .36 | 50.21 | 0.02 | 0.08 |

TABLE II (MULTILAYER DRAW TAPE)

| Sample No. | Thickness (mils) | Load (lbs.) | Elongation (%) | COSL | COSE |
|---|---|---|---|---|---|
| 1 | 3.00 | 12.21 | 391.00 | 0.74 | 0.80 |
| 2 | 3.00 | 12.45 | 421.00 | 0.76 | 0.86 |
| 3 | 2.95 | 12.39 | 421.00 | 0.75 | 0.86 |
| 4 | 3.00 | 9.38 | 267.00 | 0.57 | 0.55 |
| 5 | 3.05 | 11.68 | 376.00 | 0.71 | 0.77 |
| 6 | 3.00 | 8.66 | 160.00 | 0.53 | 0.33 |
| 7 | 3.05 | 13.86 | 449.00 | 0.84 | 0.92 |
| 8 | 3.00 | 12.68 | 410.00 | 0.77 | 0.84 |
| 9 | 2.95 | 15.38 | 487.00 | 0.94 | 1.00 |
| 10 | 2.90 | 14.30 | 453.00 | 0.87 | 0.93 |
| 11 | 2.95 | 13.51 | 430.00 | 0.82 | 0.88 |
| 12 | 3.00 | 13.53 | 454.00 | 0.82 | 0.93 |
| 13 | 3.05 | 13.88 | 447.00 | 0.84 | 0.92 |
| 14 | 3.00 | 9.36 | 222.00 | 0.57 | 0.46 |
| 15 | 3.00 | 10.82 | 369.00 | 0.66 | 0.76 |
| 16 | 3.00 | 12.64 | 394.00 | 0.77 | 0.81 |
| 17 | 2.90 | 12.77 | 420.00 | 0.78 | 0.86 |
| 18 | 3.00 | 9.01 | 124.00 | 0.55 | 0.25 |
| 19 | 3.00 | 11.88 | 382.00 | 0.72 | 0.78 |
| 20 | 3.00 | 13.44 | 431.00 | 0.82 | 0.89 |
| Average | 2.99 | 12.19 | 375.40 | 0.74 | 0.77 |
| Std. Dev. | 0.04 | 1.83 | 98.53 | 0.11 | 0.20 |

Tables I and II demonstrate that the heat seal values (COSL and COSE) for the multilayer draw tape to the bag film are significantly greater (at a 99.9% Confidence level) than a blend of the same materials formed into a single layer. This demonstrates the greater seal strength and improved draw tape bag formed by use of the multilayer draw tape.

EXAMPLE 2

A series of heat seal measurements were carried out to evaluate the strength of the heat seal of a multilayer draw tape as compared to a single layer draw tape formed from a blend of the same thermoplastic materials in substantially the same weight ratios. A multilayer draw tape was made according to the blown film procedure described in Example 1 using a high density polyethylene as the core layer having a density of 0.958 g/Cm$^3$ and a melt index of 0.05 decigrams per minute, and the outer layers were a low density polyethylene having a density of 0.926 g/Cm$^3$ and a melt index of 0.8 decigrams per minute. The ratio of the (first outside layer):(core layer):(second outside layer) on a weight percent basis was 10:80:10. In addition, each layer contained 5 percent by weight of a red colorant comprising an organic red dye and a linear low density polyethylene having a melt index of 20 decigrams per minute. A single layer draw tape was formed from a blend of the same materials used to form the multilayer draw tape. The blend comprised 75 weight percent of the high density polyethylene, 20 weight percent of the low density polyethylene and 5 percent by weight of the red colorant. Samples of each type of draw tape were prepared, using samples extruded under substantially the same extrusion conditions, by heat sealing two draw tapes together using a Weldotron Model 6312 using the heat sealing and dwell times shown in Tables III and IV as follows:

TABLE III (MULTILAYER DRAW TAPE)[1]

| Sample | Sealing Time | Heat Setting | Thickness (mils) | Load (lbs.) | Elongation (%) | COSL | COSE |
|---|---|---|---|---|---|---|---|
| 1 | 0.5 | 2 | 2.93 | 10.8 | 63 | .49 | .15 |
| 2 | 1 | 2 | 2.94 | 11.9 | 150 | .54 | .36 |
| 3 | 2 | 2 | 2.91 | 11.18 | 141 | .51 | .34 |
| 4 | 4 | 2 | 2.87 | 12.3 | 193 | .56 | .46 |
| 5 | 0.5 | 4 | 2.95 | 11.94 | 99 | .54 | .24 |
| 6 | 1 | 4 | 2.98 | 13.5 | 195 | .62 | .47 |
| 7 | 2 | 4 | 2.87 | 12.6 | 177 | .58 | .43 |
| 8 | 4 | 4 | 2.83 | 13.18 | 237 | .60 | .57 |
| 9 | 0.5 | 6 | 2.89 | 11.4 | 110 | .52 | .26 |
| 10 | 1 | 6 | 2.93 | 11.3 | 145 | .52 | .35 |
| 11 | 2 | 6 | 2.87 | 14.3 | 267 | .65 | .64 |
| 12 | 4 | 6 | 2.84 | 14.2 | 262 | .65 | .63 |
| Average: | | | 2.90 | 12.38 | 169.92 | .572 | .412 |
| Std. Dev.[2] | | | .04 | 1.13 | 61.59 | .05 | .15 |

[1]Heat seal strength of two heat sealed multilayer draw tapes.
[2]95% Confidence Limit:
COSL: 0.56 to 0.58
COSE: 0.37 to 0.45

TABLE IV (SINGLE LAYER DRAW TAPE)[1]

| Sample | Sealing Time | Heat Setting | Thickness (mils) | Load (lbs.) | Elongation (%) | COSL | COSE |
|---|---|---|---|---|---|---|---|
| 1 | 0.50 | 2.00 | 3.09 | 11.87 | 30.00 | .46 | .07 |
| 2 | 0.50 | 4.00 | 3.12 | 12.06 | 77.00 | .47 | .19 |
| 3 | 0.50 | 6.00 | 3.17 | 10.91 | 37.00 | .43 | .09 |
| 4 | 1.00 | 2.00 | 3.07 | 9.40 | 82.00 | .37 | .20 |
| 5 | 1.00 | 4.00 | 3.05 | 8.75 | 45.00 | .34 | .11 |

TABLE IV-continued (SINGLE LAYER DRAW TAPE)[1]

| Sample | Sealing Time | Heat Setting | Thickness (mils) | Load (lbs.) | Elongation (%) | COSL | COSE |
|---|---|---|---|---|---|---|---|
| 6 | 1.00 | 6.00 | 3.10 | 9.12 | 53.00 | .36 | .13 |
| 7 | 2.00 | 2.00 | 3.03 | 11.64 | 112.00 | .45 | .28 |
| 8 | 2.00 | 4.00 | 3.04 | 12.27 | 196.00 | .48 | .48 |
| 9 | 2.00 | 6.00 | 3.04 | 10.96 | 66.00 | .43 | .16 |
| 10 | 4.00 | 2.00 | 3.08 | 11.88 | 38.00 | .46 | .09 |
| 11 | 4.00 | 4.00 | 3.13 | 11.59 | 99.00 | .45 | .24 |
| 12 | 4.00 | 6.00 | 3.12 | 11.61 | 55.00 | .45 | .14 |
| Average: | | | 3.09 | 11.01 | 74.17 | .432 | .182 |
| Std. Dev.[2] | | | .04 | 1.17 | 44.10 | .05 | .11 |

[1]Heat seal strength of two heat sealed single layer draw tapes.
[2]95% Confidence Limit:
COSL: 0.42 to 0.44
COSE: 0.15 to 0.21

Tables III and IV demonstrate the superior seal strength of the multilayer draw tape to itself as compared to the strength of the heat seal of the single layer draw tape to itself. The ability of the draw tape to form a strong heat seal to itself is important since often times heat sealing of the two draw tapes and four layers of pliable bag material results in significant softening of the draw tape at the heat seal. The superior heat seal strength of the multilayer draw tape to itself will provide a stronger heat seal at the side of the draw tape bag.

EXAMPLE 3 (Comparative Example)

A commercially available draw tape bag product sold under the trademark "Cinch Sak" (Cinch Sak is the registered trademark of Mobil Chemical Company, Consumer Products Division) was evaluated by the procedure described in examples 1 and 2. The draw tape bags were obtained by randomly purchasing the sample bags at a retail establishment. The draw tape of the Cinch Sak bag is believed to be a single layer formed of a high density polyethylene (0.959 g/cm$^3$) and the side panels of the bag are believed to be one mil thick low density polyethylene. The side seals of the draw tape bags were evaluated and the following results obtained:

| Sample | Sealing Time | Heat Setting | Thickness (mils) | Load (lbs.) | Elongation (%) | COSL | COSE |
|---|---|---|---|---|---|---|---|
| 1 | 0.5 | 2 | 2 | 9.4 | 110 | .44 | .38 |
| 2 | 1 | 2 | 2 | 9.74 | 148 | .45 | .51 |
| 3 | 2 | 2 | 2 | 9.36 | 110 | .43 | .38 |
| 4 | 4 | 2 | 2 | 8.76 | 11.2 | .41 | .04 |
| 5 | 0.5 | 4 | 2 | 9.34 | 94 | .43 | .33 |
| 6 | 1 | 4 | 2 | 9.88 | 113.6 | .46 | .39 |
| 7 | 2 | 4 | 2 | 10 | 152 | .46 | .53 |
| 8 | 4 | 4 | 2 | 6.9 | 57 | .32 | .20 |
| 9 | 0.5 | 6 | 2 | 7.4 | 37.3 | .34 | .13 |
| 10 | 1 | 6 | 2 | 8.54 | 98 | .40 | .34 |
| 11 | 2 | 6 | 2 | 8.2 | 104 | .38 | .36 |
| 12 | 4 | 6 | 2 | 8.3 | 51.5 | .38 | .18 |
| Average: | | | 2.00 | 8.82 | 90.55 | .411 | .311 |
| Std. Dev. | | | .00 | .94 | 41.23 | .04 | .14 |

[1]95% Confidence Limit:
COSL: 0.40 to 0.42
COSE: 0.28 to 0.35

The COSL and COSE values for the "Cinch Sak" draw tape demonstrate the significantly lower seal strength of the seal formed by use of the single layer, high density polyethylene draw tape in the manufacture of a draw tape bag.

I claim:

1. A draw tape bag comprising:
    (a) two panels formed from a thermoplastic material, the sides of said panels being joined on three sides and open on the fourth side to form a top in said bag;
    (b) a hem portion of each panel being folded over adjacent said top to form a tubular hem;
    (c) draw tapes in each tubular hem secured at said sides of said panels by heat sealing, said draw tapes being characterized as having a multilayer structure having at least two layers wherein a first layer is characterized as having heat sealability to said thermoplastic panel and itself greater than to the second layer of the draw tape, said first layer also being characterized as having strength less than said second layer of the draw tape;
    (d) a seal between each hem portion and the adjacent panel across the width of said bag below said draw tape; and
    (e) an opening in said hem portion for accessing said draw tape.

2. A bag according to claim 1 having a draw tape comprising a first outer layer, a core layer and a second outer layer.

3. A draw tape according to claim 2 wherein said first outer layer and said second outer layer are low density polyethylene comprising a copolymer formed from ethylene and a comonomer selected from the group consisting of butene-1, pentene-1, hexene-1, heptene-1, octene-1, and mixtures thereof and said core layer is a high density polyethylene.

4. A draw tape bag according to claim 3 wherein said low density polyethylene has a melt index of between about 0.2 and about 2.0 decigrams per minute.

5. A draw tape bag according to claim 4 wherein said low density polyethylene has a melt index of between about 0.5 and about 2.0 decigrams per minute.

6. A draw tape bag according to claim 3 wherein said low density polyethylene has a density of between about 0.900 and less than 0.935 grams per cubic centimeter and said high density polyethylene has a density of between 0.935 and about 0.965 grams per cubic centimeter.

7. A draw tape bag according to claim 3 wherein said high density polyethylene has a melt index of between about 0.05 and about 6.0 decigrams per minute and a density of between about 0.945 and about 0.965 grams per cubic centimeter.

8. A draw tape bag according to claim 6 wherein said high density polyethylene has a melt index of between about 0.05 and about 2.0 decigrams per minute and a density of between about 0.945 and about 0.965 grams per cubic centimeter.

9. A draw tape bag according to claim 3 wherein said low density polyethylene comprises a copolymer of ethylene and a comonomer selected from the group consisting of butene-1, hexene-1 and mixtures thereof.

10. A draw tape bag according to claim 2 wherein the weight ratios of said first outer layer to said core layer and said second outer layer to said core layer are between about 1:20 and about 10:1.

11. A draw tape bag according to claim 10 wherein the draw tape comprises a first and second outer layer and a core layer wherein the weight ratio of said first outer layer to said core layer is between about 1:8 and about 2:1 and the weight ratio of said second outer layer to said core layer is between about 1:8 and about 2:1.

12. A draw tape bag according to claim 1 wherein said draw tape contains a colorant selected from the group consisting of a pigment, a dye and a mixture thereof.

13. A draw tape bag according to claim 2 wherein the total thickness of said draw tape is between about 1 mil and about 4 mils.

14. A draw tape bag according to claim 13 wherein the total thickness of said draw tape is between about 2 mils and about 3 mils.

15. A draw tape bag according to claim 2 wherein said first layer comprises low density polyethylene and said second layer comprises high density polyethylene.

16. A draw tape bag according to claim 2 comprising a draw tape having a first outer layer, a core layer and a second outer layer wherein the first outer layer is selected from the group consisting of low density polyethylene, ultra low density polyethylene, ethylene-methyl acrylate, ethylene-ethyl acrylate, ethylene-vinyl acetate, and mixtures thereof, the core layer is selected from the group consisting of high density polyethylene, polyesters, polyamides, oriented polyethylenes and mixtures thereof, and the second outer layer is selected from the group consisting of low density polyethylene, ultra low density polyethylene, ethylene-methyl acrylate, ethylene-ethyl acrylate, ethylene-vinyl acetate and mixtures thereof.

17. A draw tape bag having multilayer draw tape according to claim 16 comprising a first outer layer of low density polyethylene, a core layer comprising two or more layers wherein at least one of said layers comprises high density polyethylene, and a second outer layer selected from the group consisting of low density polyethylene, ultra low density polyethylene, ethylene-methyl acrylate, ethylene-ethyl acrylate, ethylene-vinyl acetate and mixtures thereof.

18. A draw tape bag according to claim 16 having a draw tape wherein said first and second outer layers each comprise low density polyethylene containing a colorant and said core layer is high density polyethylene containing a colorant.

19. A draw tape bag comprising:
   (a) two panels comprising low density polyethylene, the sides of said panels being joined on three sides and open on the fourth side to form a top in said bag;
   (b) a hem portion of each panel being folded over adjacent said top to form a tubular hem;
   (c) draw tapes in each tubular hem secured at said sides of said panels by heat sealing, said draw tapes being characterized as having a multilayer structure having a first outside layer and second outside layer formed from low density polyethylene and a core layer formed of high density polyethylene, the weight ratio of said first outside layer to said core layer being between about 1:20 and about 10:1 and the weight ratio of said second outside layer to said core layer being between about 1:20 and about 10:1;
   (d) a seal between each hem portion and the adjacent panel across the width of said bag below said draw tape; and
   (e) an opening in said hem portion for accessing said draw tape.

20. A draw tape bag according to claim 19 wherein said draw tape comprises a low density polyethylene copolymer formed from ethylene and a comonomer selected from the group consisting of butene-1, pentene-1, hexene-1, heptene-1, octene-1, and mixtures thereof.

21. A draw tape bag according to claim 19 wherein said low density polyethylene has a density of between about 0.900 and less than 0.935 grams per cubic centimeter and said high density polyethylene has a density of between 0.935 and about 0.965 grams per cubic centimeter.

22. A draw tape bag according to claim 20 wherein said low density polyethylene comprises a copolymer of ethylene and butene-1 or hexene-1.

23. A draw tape bag according to claim 19 wherein the weight ratios of said first outer layer to said core layer and said second outer layer to said core layer are between about 1:20 and about 10:1.

24. A draw tape bag according to claim 23 wherein the draw tape comprises a first and second outer layer and a core layer wherein the weight ratio of said first outer layer to said core layer is between about 1:8 and about 2:1 and the weight ratio of said second outer layer to said core layer is between about 1:8 and about 2:1.

25. A draw tape bag according to claim 19 wherein said draw tape contains a colorant selected from the group consisting of a pigment, a dye and a mixture thereof.

26. A draw tape bag according to claim 19 wherein the total thickness of said draw tape is between about 1 mil and about 4 mils.

27. A draw tape bag according to claim 26 wherein the total thickness of said draw tape is between about 2 mils and about 3 mils.

28. A draw tape bag according to claim 19 comprising a draw tape having a first outer layer, a core layer and a second outer layer wherein the first outer layer is selected from the group consisting of low density polyethylene, ethylene-methyl acrylate, ethylene-ethyl acrylate, ethylene-vinyl acetate and mixtures thereof, the core layer is selected from the group consisting of high density polyethylene, polyesters, polyamides, oriented polyethylene, and mixtures thereof and the second outer layer is selected from the group consisting of low density polyethylene, ethylene-methyl acrylate, ethylene-ethyl acrylate, ethylene-vinyl acetate and mixtures thereof.

29. A draw tape bag having a multilayer draw tape according to claim 19 comprising a first outer layer of low density polyethylene, a core layer comprising two or more layers wherein at least one of said layers comprises high density polyethylene, and a second outer layer comprising low density polyethylene.

30. A draw tape bag according to claim 16 wherein said high density polyethylene is an oriented high density polyethylene.

31. A draw tape bag according to claim 30 wherein said oriented high density polyethylene is oriented by physical stretching.

32. A draw tape bag according to claim 10 wherein the weight ratio of the first outer layer to the second outer layer is between about 1:20 and about 20:1.

33. A draw tape bag according to claim 19 wherein said high density polyethylene is an oriented polyethylene.

34. A draw tape bag according to claim 33 wherein said oriented polyethylene is oriented by physical stretching.

35. A draw tape bag according to claim 19 wherein the weight ratio of the first outer layer to the second outer layer is between about 1:20 and about 20:1.

36. A draw tape bag according to claim 32 wherein the weight ratio of the first outer layer to the second outer layer is between about 1:8 and about 2:1.

37. A draw tape bag according to claim 36 wherein the weight ratio of this first outer layer to the core 38. A draw tape bag according to claim 1 wherein the first layer is selected from the group consisting of low density polyethylene, ultra low density polyethylene, ethylene-methyl acrylate, ethylene-ethyl acrylate, ethylene-vinyl acetate and mixtures thereof, and the second layer is selected from the group consisting of high density polyethylene, polyesters, polyamides, oriented polyethylene, and mixtures thereof.

39. A draw tape bag according to claim 38 wherein said draw tape contains a colorant selected from the group consisting of a pigment, a dye and a mixture thereof.

* * * * *